(12) United States Patent
Dempsey et al.

(10) Patent No.: US 10,234,156 B2
(45) Date of Patent: Mar. 19, 2019

(54) SYSTEM AND METHOD OF DETERMINING PROPER OPERATION OF AN HVAC SYSTEM

(71) Applicant: Carrier Corporation, Farmington, CT (US)

(72) Inventors: Daniel J. Dempsey, Carmel, IN (US); Jun Pyo Lee, Zionsville, IN (US)

(73) Assignee: CARRIER CORPORATION, Farmington, CT (US)

( * ) Notice: Subject to any disclaimer, the term of this patent is extended or adjusted under 35 U.S.C. 154(b) by 180 days.

(21) Appl. No.: 15/236,164

(22) Filed: Aug. 12, 2016

(65) Prior Publication Data

US 2017/0045253 A1 Feb. 16, 2017

Related U.S. Application Data

(60) Provisional application No. 62/204,059, filed on Aug. 12, 2015.

(51) Int. Cl.
| | |
|---|---|
| *G05D 23/19* | (2006.01) |
| *F24F 11/30* | (2018.01) |
| *F24F 110/10* | (2018.01) |
| *F24F 130/00* | (2018.01) |
| *F24F 130/10* | (2018.01) |
| *F24F 11/52* | (2018.01) |

(52) U.S. Cl.
CPC ............. *F24F 11/30* (2018.01); *G05D 23/19* (2013.01); *F24F 11/52* (2018.01); *F24F 2110/10* (2018.01); *F24F 2130/00* (2018.01); *F24F 2130/10* (2018.01)

(58) Field of Classification Search
CPC ........ F24F 11/30; F24F 11/52; F24F 2130/00; F24F 2110/10; F24F 2130/10; G05D 23/19

See application file for complete search history.

(56) References Cited

U.S. PATENT DOCUMENTS 4,094,166 A * 6/1978 Jerles ................... F24F 11/0009
236/46 R
5,513,796 A * 5/1996 Matsumoto ........ G05D 23/1905
236/51

(Continued)

FOREIGN PATENT DOCUMENTS

EP 1134508 A2 9/2001

OTHER PUBLICATIONS

"Innovative heating control concept—Cuts energy consumption by up to 30%"; Authors: Hutter et al.; English Translation of the article, Neues Konzept für Heizungsregelung ITG Sonderausgabe Bulletin electrosuisse und SEV/AES Oct. 19, 2012; Itelligent Buildings; 7 pgs.

*Primary Examiner* — Larry Furdge
(74) *Attorney, Agent, or Firm* — Cantor Colburn LLP (57) ABSTRACT

A system and method for determining proper operation of an HVAC system by generating a test condition, operating the HVAC system in a heating or cooling mode for either an operational duration of time or until a first indoor air temperature change limit is achieved, if the test condition is satisfied, determining whether the HVAC system is performing at an operational tolerance level, and generating an alert signal if the HVAC system is not performing at the operational tolerance level.

34 Claims, 6 Drawing Sheets

(56) References Cited

U.S. PATENT DOCUMENTS

| | | | |
|---|---|---|---|
| 5,632,156 A * | 5/1997 | Takeo | B60H 1/3205 62/160 |
| 6,098,893 A | 8/2000 | Berglund et al. | |
| 7,225,054 B2 | 5/2007 | Amundson et al. | |
| 8,219,249 B2 | 7/2012 | Harrod et al. | |
| 8,892,223 B2 | 11/2014 | Leen et al. | |
| 9,002,523 B2 | 4/2015 | Erickson et al. | |
| 2002/0109011 A1 * | 8/2002 | Fleckenstein | F24F 11/30 236/49.3 |
| 2009/0050703 A1 | 2/2009 | Lifson et al. | |
| 2011/0191634 A1 * | 8/2011 | Park | G05B 15/02 714/32 |
| 2011/0264278 A1 * | 10/2011 | Gilbert | G05D 23/1904 700/277 |
| 2012/0061068 A1 * | 3/2012 | Anderson | F24F 11/0009 165/254 |
| 2012/0253525 A1 * | 10/2012 | Suzuki | F24F 11/30 700/277 |
| 2013/0151012 A1 | 6/2013 | Shetty et al. | |
| 2014/0151456 A1 * | 6/2014 | McCurnin | G05D 23/1905 236/51 |
| 2014/0200718 A1 | 7/2014 | Tessier | |
| 2014/0249876 A1 | 9/2014 | Wu et al. | |
| 2014/0346237 A1 | 11/2014 | Mirza et al. | |
| 2015/0066215 A1 | 3/2015 | Buduri | |

* cited by examiner

SYSTEM AND METHOD OF DETERMINING PROPER OPERATION OF AN HVAC SYSTEM

CROSS-REFERENCE TO RELATED APPLICATIONS

The present application is a nonprovisional patent application, which claims priority to U.S. Provisional Patent Application Ser. No. 62/204,059, filed Aug. 12, 2015, and having the title "SYSTEM AND METHOD FOR DETERMINING PROPER OPERATION OF AN HVAC SYSTEM," which is herein incorporated in its entirety.

TECHNICAL FIELD OF THE DISCLOSED EMBODIMENTS

The presently disclosed embodiments generally relate to appliances for heating and cooling air, and more particularly, to a system and method for determining proper operation of an HVAC system.

BACKGROUND OF THE DISCLOSED EMBODIMENTS

Generally, during the change of seasons, a homeowner may not be aware of issues with their HVAC system until the first day an HVAC unit is placed in operation. In most instances the homeowner finds that the HVAC unit is not working due to a refrigerant leak or a plugged combustion air intake or vent pipe to name a couple of non-limiting examples. The homeowner, then attempts to have the HVAC unit serviced only to find that the HVAC contractor is not available due to an increasing number of service calls for the same seasonal start up issues. This leads to frustration on the part of the homeowner as this increases his/her cost to service the HVAC unit, or the homeowner must wait days until the HVAC unit may be serviced.

Accordingly, there exists a need for a system and method to determine proper operation of the HVAC system during the seasonal startup period.

SUMMARY OF THE DISCLOSED EMBODIMENTS

In one aspect, an HVAC system is provided. The HVAC system includes a system controller including a processor in communication with a memory, an indoor temperature sensor, and a communication module. The HVAC system further includes at least one of an indoor HVAC unit and an outdoor HVAC unit, each in communication with the system controller. In some embodiments, the outdoor HVAC unit may include an outdoor controller.

In one aspect, a method of determining proper operation of the HVAC system is provided. The method includes the step of operating the system controller to generate a test condition. In an embodiment, operating the system controller to generate a test condition includes the step of operating the system controller to determine whether either the indoor HVAC unit or the outdoor HVAC unit has operated in a heating or cooling mode within an idle duration of time. In an embodiment, the idle duration of time is greater than or equal to approximately 14 days.

If it is determined that either, or in some embodiments both, the indoor HVAC unit or the outdoor HVAC unit has not operated in a heating or cooling mode within the idle duration of time, the method proceeds to the step of operating the system controller to acquire weather information from an external source. In an embodiment, the external source is configured to supply up to date, but not necessarily instantaneous, weather information. In one embodiment, the weather information is based at least upon a geographical location of the HVAC system. In one embodiment, the weather information includes a plurality of forecasted air temperature values within a forecasted period of time. In one embodiment, the weather information also includes at least one forecasted humidity value. In an embodiment, the forecasted period of time is less than or equal to 5 days.

In an embodiment, operating the system controller to generate a test condition further includes the step of determining whether one of the plurality of forecasted air temperature values is greater than or equal to a cooling limit temperature value or less than or equal to a heating limit temperature value. In an embodiment, the cooling limit temperature value is approximately 75° Fahrenheit (approximately 23.9° Celsius). In an embodiment, the heating limit temperature value is approximately 50° Fahrenheit (approximately 10° Celsius).

In an embodiment, if the plurality of forecasted air temperature values is less than the cooling limit temperature value or greater than the heating limit temperature value, the method may proceed to the step of determining whether one of the plurality of forecasted air temperature values is greater than or equal to a minimum outdoor air temperature value of the last operation of the HVAC unit in a cooling mode or less than or equal to a maximum outdoor air temperature value of the last operation of the HVAC unit in a heating mode.

If any of the test conditions is satisfied, the method proceeds to the step of operating the indoor HVAC unit and/or the outdoor HVAC unit in a heating or cooling mode. In an embodiment, the indoor HVAC unit and/or outdoor HVAC unit operates for an operational duration of time or until a first indoor air temperature change limit has been achieved, whichever comes first.

In an embodiment, the operational duration of time is less than or equal to approximately 30 minutes. In one embodiment, first indoor air temperature change limit is approximately 2° Fahrenheit (approximately 1.1° Celsius).

If the indoor HVAC unit and/or the outdoor HVAC unit operates for the entire operational duration of time, the method proceeds to the step of operating the system controller to determine whether the outdoor HVAC unit and/or indoor HVAC unit is performing at an operational tolerance level. In an embodiment, determining whether the outdoor HVAC unit and/or indoor HVAC unit is performing at an operational tolerance level includes the step of recording a first indoor air temperature value within a first interval and a second indoor air temperature within a second interval. In an embodiment, the first interval comprises an interval greater than or equal to approximately 5 minutes, and the second interval comprises an interval equal to approximately 10 minutes from the determination of the first indoor air temperature value within the first interval.

Once the first indoor air temperature value and the second indoor air temperature value have been recorded, the method proceeds to the step of determining whether the difference between the first indoor air temperature value and the second indoor air temperature value is less than or equal to a second indoor air temperature change limit. In one embodiment, the first indoor air temperature change limit is less than or equal to approximately 0.5° Fahrenheit (approximately 0.3° Celsius).

If the difference between the first indoor air temperature value and the second indoor air temperature value is less than or equal to the second indoor air temperature change limit, the method proceeds to the step of operating the system controller to generate an alert signal. In an embodiment, the alert signal comprises at least one of a visual signal, an audio signal, and an electronic signal.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
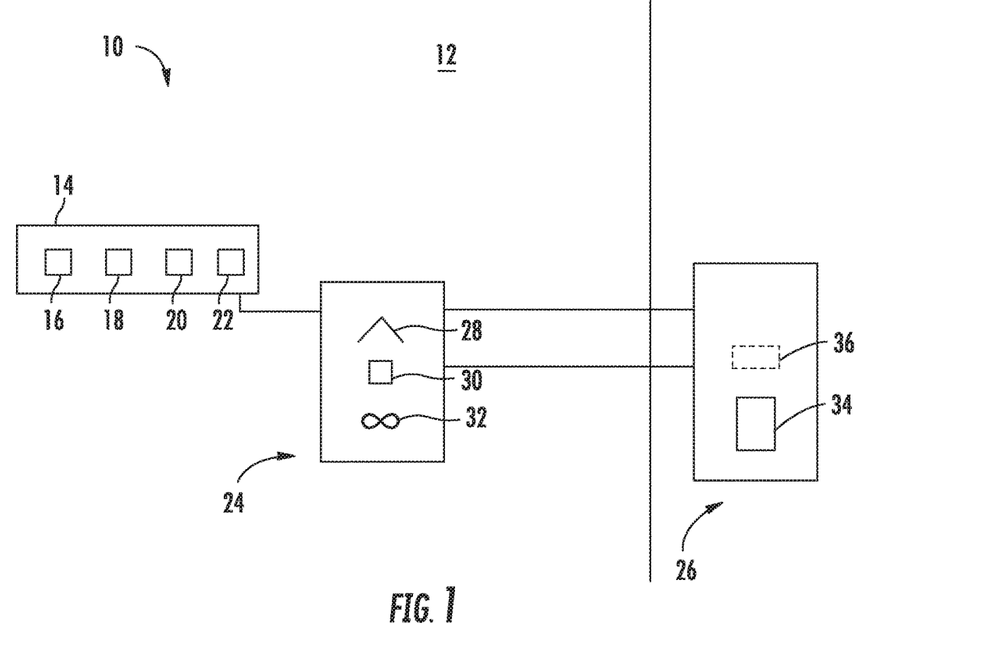
FIG. 1 illustrates a schematic diagram of a HVAC system according to an embodiment of the present disclosure.

FIG. 1 schematically illustrates an embodiment of an HVAC system, generally indicated at 10, configured to condition air within an interior space 12. The HVAC system 10 includes a system controller 14 including a processor 16 in communication with a memory 18, an indoor temperature sensor 20, and a communication module 22. It will be appreciated that the indoor temperature sensor 20 may be external of the system controller 14.

The HVAC system 10 further includes at least one of an indoor HVAC unit 24 and an outdoor HVAC unit 26, each in communication with the system controller 14. In the illustrated, non-limiting embodiment, the indoor HVAC unit 24 is a fan coil including an evaporator coil 28, and an indoor controller 30 in communication with an indoor fan assembly 32. In the illustrated, non-limiting embodiment, the outdoor HVAC unit 26 is a heat pump including a compressor 34. In some embodiments, the outdoor HVAC unit 26 may include an outdoor controller 36.

In one embodiment to condition the interior space 12, the compressor 34 is fluidically coupled to the evaporator coil 28. Compressed refrigerant flows through the evaporator coil 28. As the refrigerant flows through the evaporator coil 28, the indoor fan assembly 32 operates to circulate conditioned air through a supply conduit (not shown) to the interior space 12. It will be appreciated that the indoor HVAC unit 24 may also include a furnace and evaporator coil combination, and a geothermal heat pump to name a couple of non-limiting example. In applications with a geothermal heat pump, water (in lieu of refrigerant) is circulated through the system. It will further be appreciated that the outdoor HVAC unit 26 may also include an air conditioner, a packaged unit, or be eliminated entirely in the case of a geothermal heat pump, to name a couple of non-limiting examples.

Figure 2:
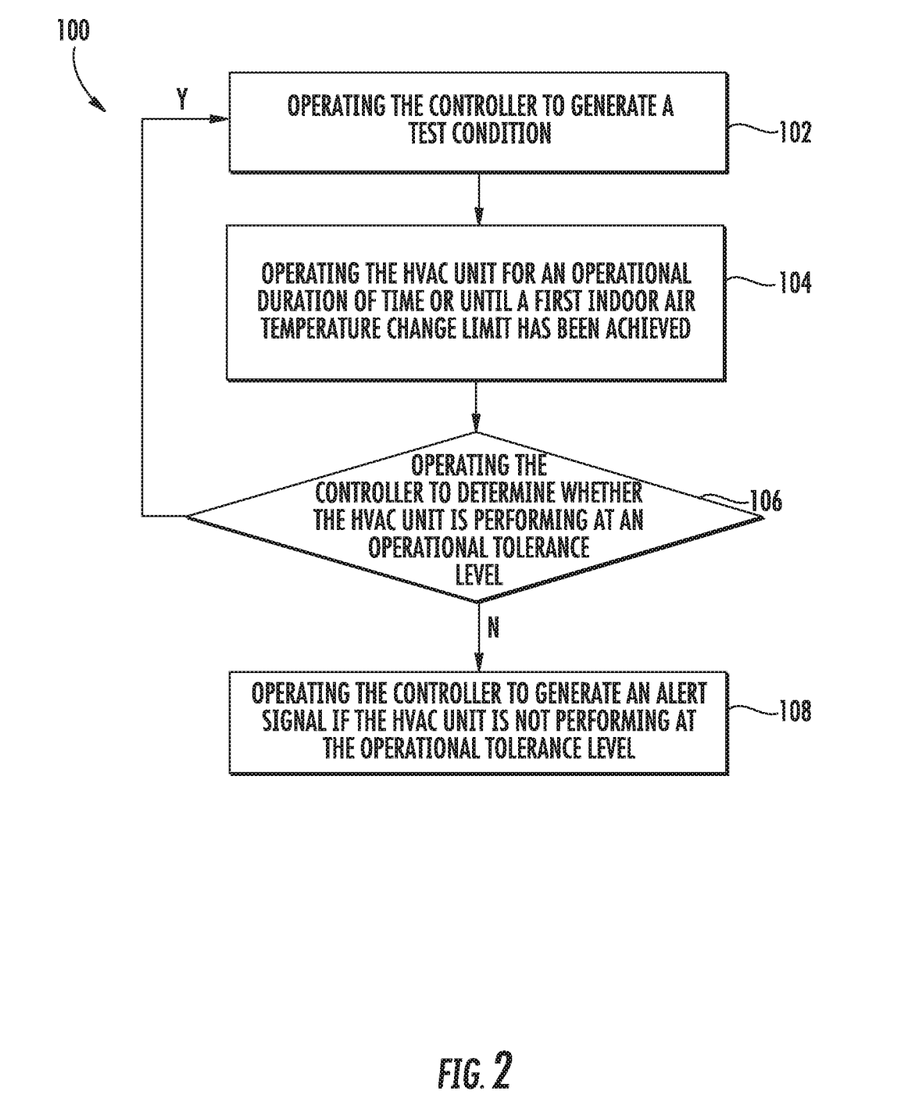
FIG. 2 illustrates a schematic flow diagram of a method for determining proper operation of an HVAC system according to one embodiment of the present disclosure.

FIG. 2 illustrates a method of determining proper operation of the HVAC system 10, the method generally indicated at 100. The method includes step 102 of operating the system controller 14 to generate a test condition. This is particularly relevant during periods when the seasons change. Depending on whether you are entering heating or cooling season, the indoor HVAC unit 24 (e.g. a furnace) and/or the outdoor HVAC unit 26 (e.g. an air conditioner) may go several days, weeks or months without operating as it is not needed.

Figure 3:
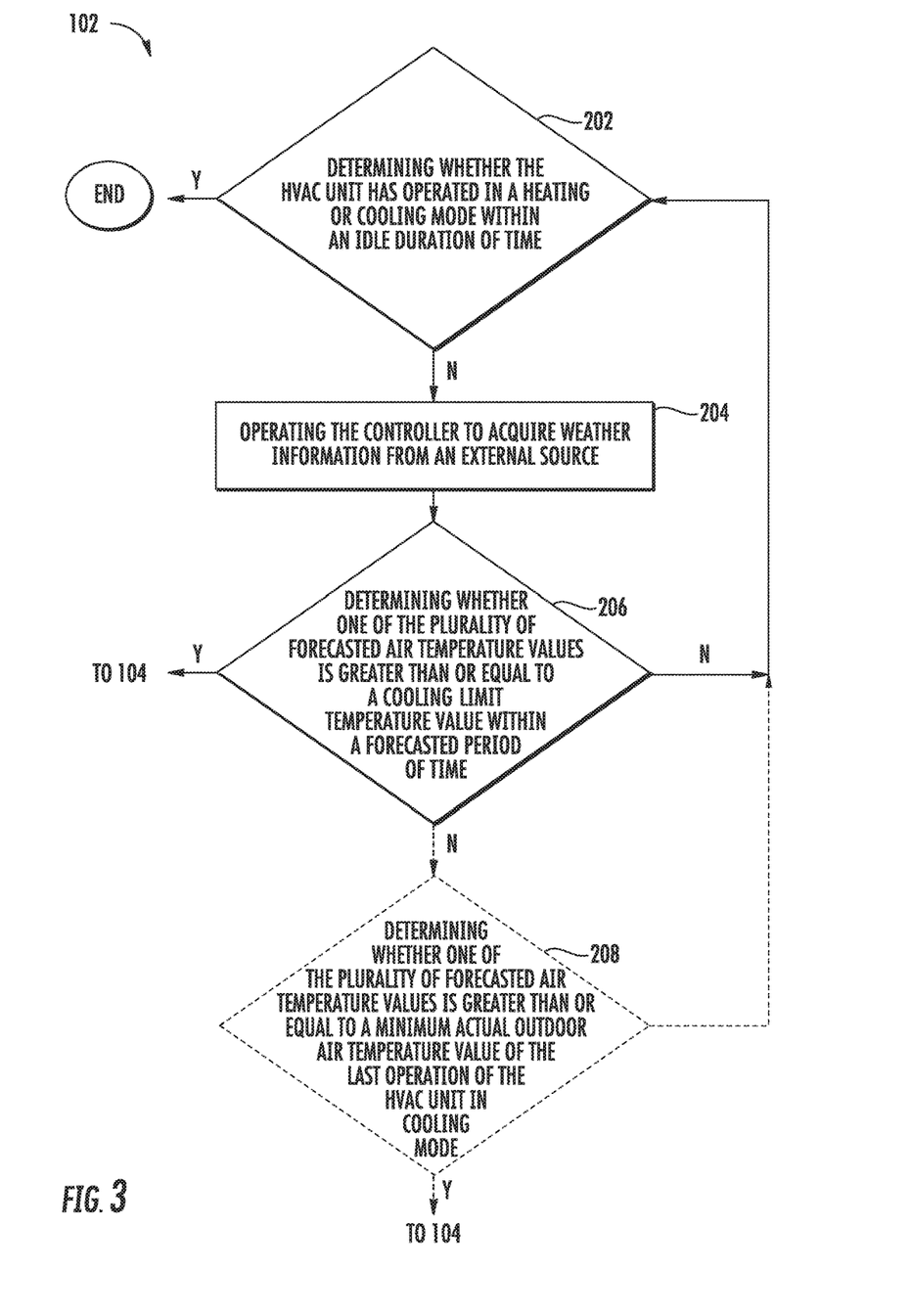
FIG. 3 illustrates a schematic flow diagram of a method for determining proper operation of an HVAC system according to one embodiment of the present disclosure.

FIG. 3 illustrates an embodiment where the HVAC system 10 is entering cooling season. Step 102 further includes step 202 of operating the system controller 14 to determine whether either the indoor HVAC unit 24 or the outdoor HVAC unit 26 has operated in a heating or cooling mode within an idle duration of time. In one embodiment, the method determines whether both the indoor HVAC unit 24 and the outdoor HVAC unit 26 have operated in a heating or cooling mode within the idle duration of time. In an embodiment, the idle duration of time is greater than or equal to approximately 14 days. It will be appreciated that the idle duration of time may be less than approximately 14 days.

If it is determined that either, or in some embodiments both, the indoor HVAC unit 24 or the outdoor HVAC unit 26 has operated in a heating or cooling mode within the idle duration of time, the method ends. If it is determined that either, or in some embodiments both, the indoor HVAC unit 24 or the outdoor HVAC unit 26 has not operated in a heating or cooling mode within the idle duration of time, the method proceeds to step 204 of operating the system controller 14 to acquire weather information from an external source (not shown). In an embodiment, the external source is configured to supply up to date, but not necessarily instantaneous, weather information. In one embodiment, the weather information is based at least upon a geographical location of the HVAC system 10. In one embodiment, the weather information includes a plurality of forecasted air temperature values over a forecasted period of time. In one embodiment, the weather information also includes at least one forecasted humidity value.

For example, the system controller 14 operates the communication module 22 to access an external weather website (e.g. the National Oceanic and Atmospheric Administration to name one non-limiting example), or other sources, to acquire forecasted air temperature values based upon the location of the HVAC system 10. It will be appreciated that the secondary source may include a website, or a live feed, or any other source capable of supplying up to date, but not necessarily instantaneous, air temperature data to name a few of non-limiting examples.

Step 102 further includes step 206 of determining whether one of the plurality of forecasted air temperature values is greater than or equal to a cooling limit temperature value. In an embodiment, the cooling limit temperature value is approximately 75° Fahrenheit (approximately 23.9° Celsius). It will be appreciated that the cooling limit value may be adjustable to any suitable temperature value for operation of either the indoor HVAC unit 24 and/or the outdoor HVAC unit 26 in a cooling mode. In an embodiment, the forecasted period of time is less than or equal to 5 days. It will be appreciated that the forecasted period of time may be greater than 5 days.

If one of the plurality of forecasted air temperature values is greater than or equal to the cooling limit temperature value, the method proceeds to step 104; however, if the plurality of forecasted air temperature values are less than the cooling limit temperature value, the method returns to step 202. In one example, the system controller 14 determines whether either the indoor HVAC unit 24 and/or the outdoor HVAC unit 26 have operated within the last 14 days. By way of example, if the outdoor HVAC unit 26 has not operated within the last 14 days, the system controller 14 determines whether the one of the plurality of forecasted air temperature within the next 5 days is greater than or equal to 75° Fahrenheit (23.9° Celsius). If the forecasted air temperature within the next 5 days is greater than or equal to 75° Fahrenheit (23.9° Celsius), the method 100 proceeds to step 104. If this condition is not satisfied, the method 100 returns to step 202.

In an embodiment, if the plurality of forecasted air temperature values is less than the cooling limit temperature value, the method may proceed to step 208 of determining whether one of the plurality of forecasted air temperature values is greater than or equal to a minimum actual outdoor air temperature value of the last operation of the HVAC unit in cooling mode. If one of the plurality of forecasted air temperature values is greater than or equal to the minimum actual outdoor air temperature value of the last operation of the HVAC unit, the method proceeds to step 104. In some embodiments, step 208 may be omitted.

For example, the system controller 14 determines whether the forecasted air temperature within the next 5 days is greater than or equal to the minimum actual outdoor air temperature in which either the indoor HVAC unit or the outdoor HVAC unit 26 last operated based on its history. By way of a non-limiting example, if the outdoor HVAC unit 26 last operated in a cooling mode when the actual outdoor air temperature value was approximately 68° Fahrenheit (approximately 20° Celsius) and if the forecasted temperature is greater than or equal to 68° Fahrenheit, the method 100 proceeds to step 104.

Figure 4:
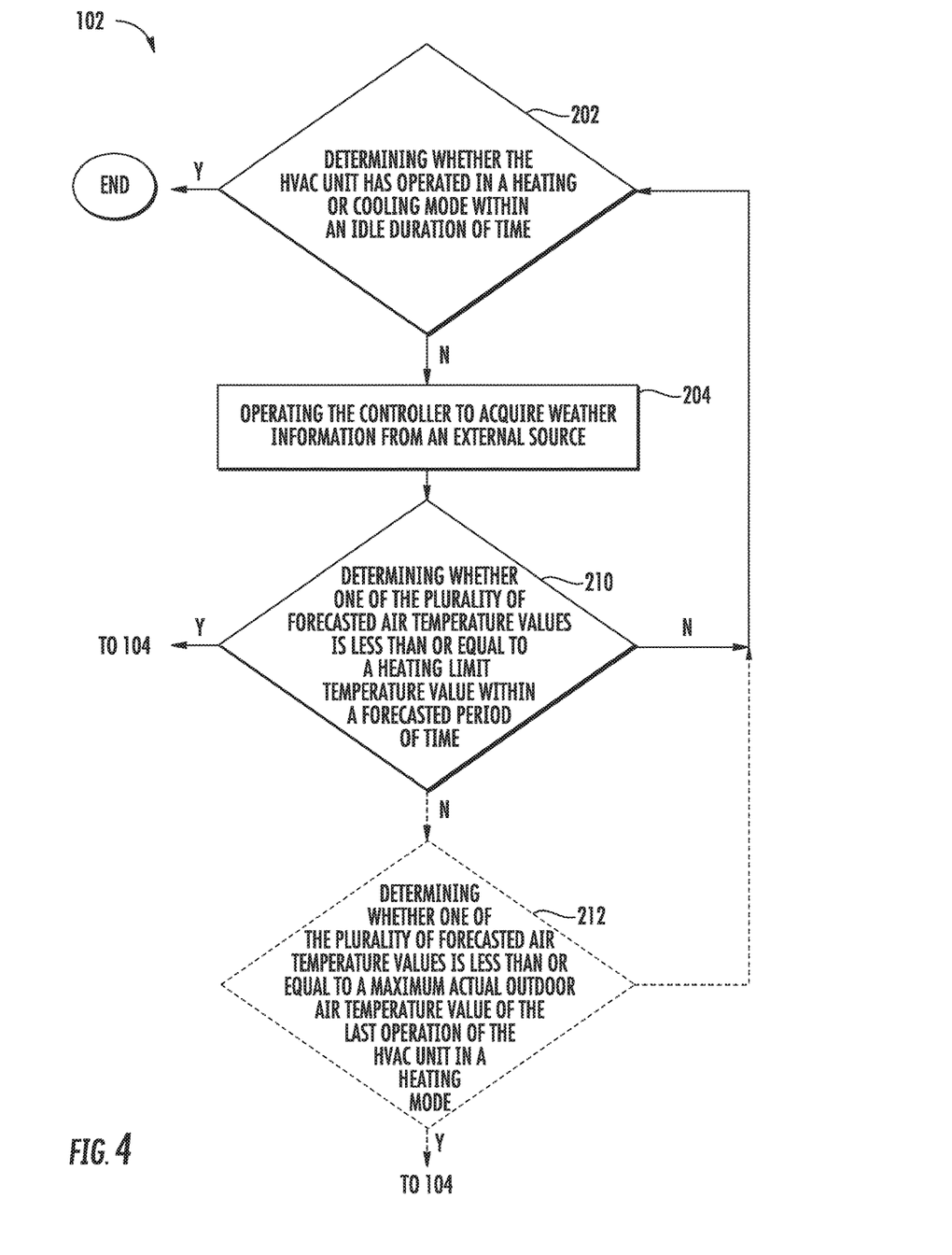
FIG. 4 illustrates a schematic flow diagram of a method for determining proper operation of an HVAC system according to one embodiment of the present disclosure.

FIG. 4 illustrates an embodiment where the HVAC system 10 is entering heating season. Here, step 102 includes the same steps 202 and 204 as described above. After step 204, the method proceeds to step 210, which includes determining whether one of the plurality of forecasted air temperature values is less than or equal to a heating limit temperature value. In an embodiment, the heating limit temperature value is approximately 50° Fahrenheit (approximately 10° Celsius). It will be appreciated that heating limit temperature value may be adjustable to any suitable air temperature value for operation of either the indoor HVAC unit 24 and/or the outdoor HVAC unit 26 in a heating mode.

If one of the plurality of forecasted air temperature values is less than or equal to the heating limit temperature value, the method proceeds to step 104; however, if the plurality of forecasted air temperature values are greater than the heating limit temperature value, the method returns to step 202. In one example, the system controller 14 determines whether either the indoor HVAC unit 24 and/or the outdoor HVAC unit 26 have operated within the last 14 days. By way of example, if the indoor HVAC unit 24 has not operated within the last 14 days, the system controller 14 determines whether one of the plurality of forecasted air temperature values within the next 5 days is less than or equal to 50° Fahrenheit (approximately 10° Celsius). If the forecasted air temperature within the next 5 days is less than or equal to 50° Fahrenheit (approximately 10° Celsius), the method 100 proceeds to step 104. If this condition is not satisfied, the method 100 returns to step 202.

In an embodiment, if the plurality of forecasted air temperature values is greater than the heating limit temperature value, the method may proceed to step 212 of determining whether one of the plurality of forecasted air temperature values is less than or equal to a maximum actual outdoor air temperature value of the last operation of the HVAC unit in heating mode. If one of the plurality of forecasted air temperature values is less than or equal to the maximum actual outdoor air temperature value of the last operation of the HVAC unit in heating mode, the method proceeds to step 104. In some embodiments, step 212 may be omitted.

For example, the system controller 14 determines whether the forecasted air temperature within the next 5 days is less than or equal to the maximum actual outdoor air temperature in which either the indoor HVAC unit 24 and/or the outdoor HVAC unit 26 last operated based on its history. By way of a non-limiting example, if the indoor HVAC unit 24 last operated when the maximum actual outdoor air temperature value was approximately 67° Fahrenheit (approximately 19.4° Celsius), and if the forecasted temperature is less than or equal to 67° Fahrenheit, the method 100 proceeds to step 104.

Once any of the conditions from step 102 are satisfied, the method 100 proceeds to step 104 of operating the indoor HVAC unit 24 and/or the outdoor HVAC unit 26. The method 100 operates the indoor HVAC unit 24 and/or the outdoor HVAC unit 26 for either an operational duration of time or until a first indoor air temperature change limit has been achieved, whichever comes first.

In an embodiment, the operational duration of time is less than or equal to approximately 30 minutes. It will be appreciated that the operational duration of time may be greater than approximately 30 minutes. In one embodiment, the first indoor air temperature change limit is approximately 2° Fahrenheit (approximately 1.1° Celsius). It will be appreciated that the first indoor air temperature change limit may adjustable to be greater than or less than approximately 2° Fahrenheit (approximately 1.1° Celsius).

For example, if any of the test conditions from step 102 is satisfied, the system controller 14 sends a signal to the indoor HVAC unit 24 and/or the outdoor HVAC unit 26 to operate in a heating or cooling mode. In a non-limiting example, the outdoor HVAC unit 26 will operate in the cooling mode until the indoor air temperature is lowered by approximately 2° Fahrenheit (approximately 1.1° Celsius) or the outdoor HVAC unit 26 operates for approximately 30 minutes, whichever comes first.

Figure 5:
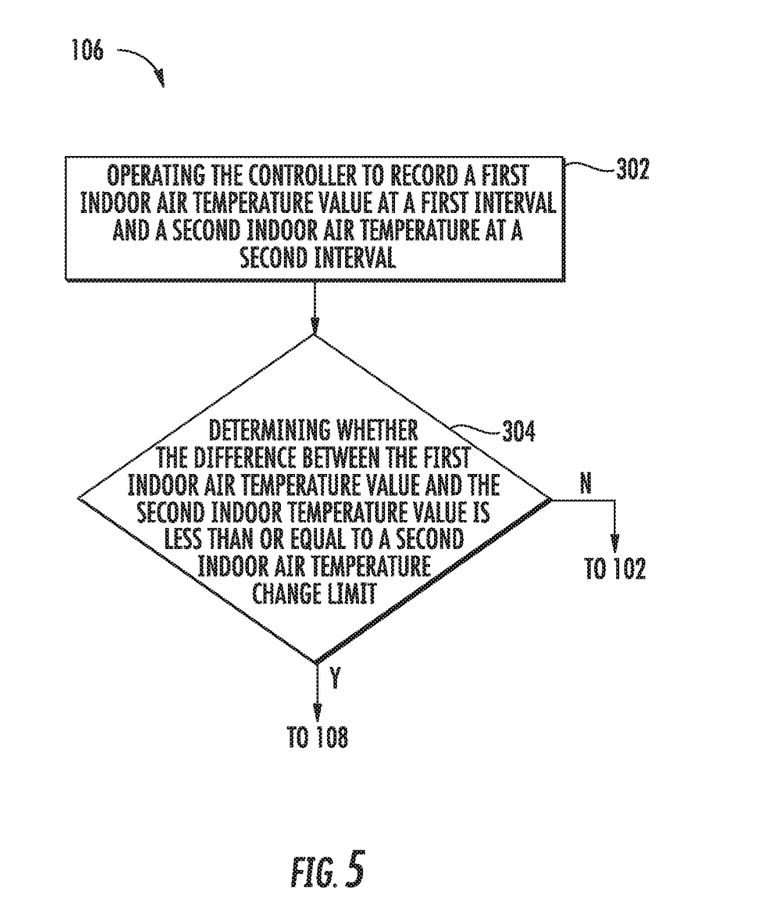
FIG. 5 illustrates a schematic flow diagram of a method for determining proper operation of an HVAC system according to one embodiment of the present disclosure.
Figure 6:
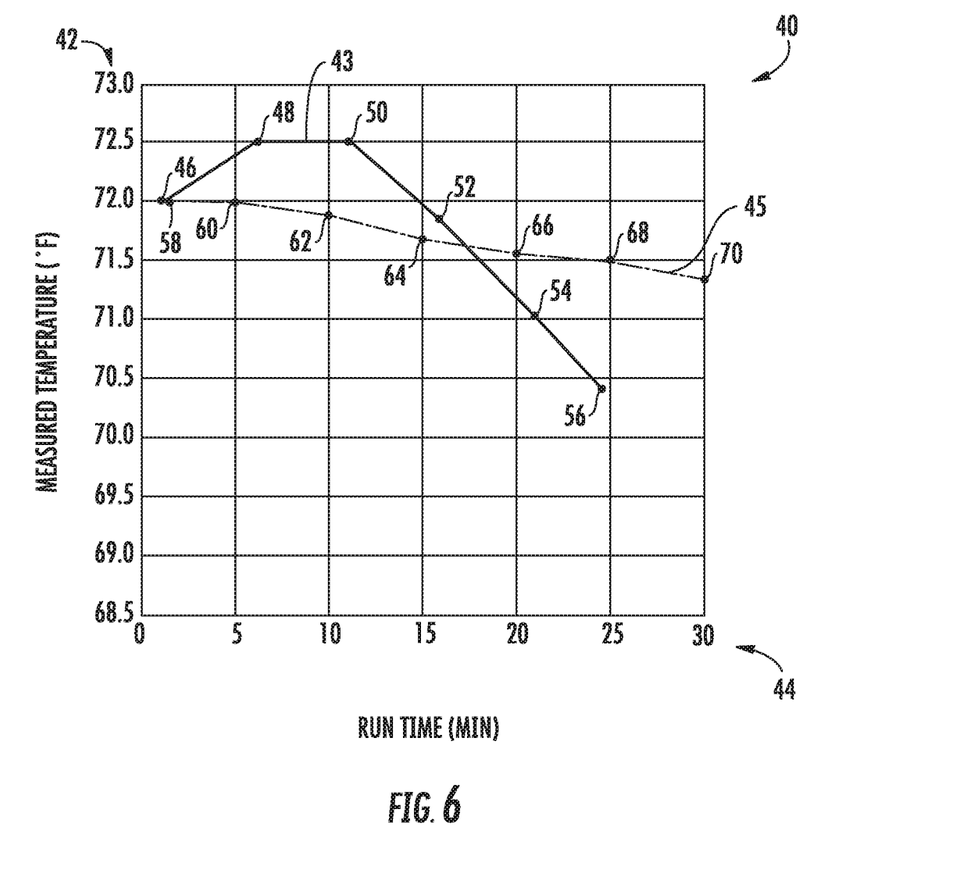
FIG. 6 illustrates a graph of performance data for an HVAC unit according to an embodiment of the present disclosure.

If the first indoor air temperature change limit is achieved before the end of the operational duration of time, it may be assumed that the HVAC system 10 is operating properly. If the indoor HVAC unit 24 and/or the outdoor HVAC unit 26 operates for the entire operational duration of time, the method 100 proceeds to step 106 of operating the system controller 14 to determine whether the outdoor HVAC unit 26 and/or indoor HVAC unit 24 is performing at an operational tolerance level. In an embodiment, as shown in FIGS. 5 and 6, determining whether the outdoor HVAC unit 26 and/or indoor HVAC unit 24 is performing at an operational tolerance level includes step 302 of recording a first indoor air temperature value within a first interval and a second indoor air temperature within a second interval. The first indoor air temperature value may be indicative of the highest indoor temperature value during the beginning of a cooling cycle or the lowest indoor air temperature value during the beginning of a heating cycle.

In an embodiment, the first interval comprises an interval greater than or equal to approximately 5 minutes, and the second interval comprises an interval equal to approximately 10 minutes from the determination of the first indoor air temperature value within the first interval. It will be appreciated that the first interval and second interval are adjustable to be any interval suitable to determine the appropriate temperature change.

An example of cooling performance data 40 is graphically shown in FIG. 6, wherein a Y-axis 42 is measured indoor air temperature values, an X-axis 44 represents the run time of the HVAC system 10, and data points 46-70 represent performance data plotted as temperature change versus run time as performed by taking measurements of the HVAC system 10 in operation. It will be appreciated that the graph of FIG. 6 is just for illustration, and that the actual data points 46-70 may lie in a much different arrangement, depending on the particular HVAC unit(s) and other factors.

In one of the example of FIG. 6, represented by data points 46-56, system controller 14 determines that when the outdoor HVAC unit 26 begins the cooling cycle, the indoor air temperature value is measured at 72° Fahrenheit (i.e. 0° Fahrenheit temperature change at data point 46). During approximately the first 12 minutes of cooling operation (i.e. the first interval), the highest indoor air temperature value is measured at 72.5° Fahrenheit (i.e. 0.5° first indoor air temperature value at data point 50). The system controller 14 records the indoor air temperature value of 72.5° Fahrenheit in memory for analysis. Since the temperature of 72.5° Fahrenheit was sustained during a duration of timer, the system controller 14 records the latest point in time at which the temperature was observed at the high of 72.5° Fahrenheit. In one embodiment, the system controller 14 records the first point in time at which the sustained high temperature was observed. In one embodiment, the system controller 14 records the middle point in time at which the sustained high temperature was observed.

Next, the system controller 14 measures the indoor air temperature value at approximately 10 minutes from the time the highest indoor temperature value was determined. Therefore, at approximately 22 minutes (i.e. the second interval), the indoor temperature value is measured at approximately 71.1° Fahrenheit (i.e. the second indoor air temperature value at data point 54).

Once the first indoor air temperature value and the second indoor air temperature value have been recorded, the method proceeds to step 304 of determining whether the difference between the first indoor air temperature value and the second indoor air temperature value is less than or equal to a second indoor air temperature change limit. In one embodiment, the second indoor air temperature change limit is less than or equal to approximately 0.5° Fahrenheit (approximately 0.3° Celsius). It will be appreciated that the second indoor air temperature change limit may be adjustable, and greater than approximately 0.5° Fahrenheit (approximately 0.3° Celsius).

Continuing with the example represented by data points 46-56 in FIG. 6, the system controller 14 determines whether the difference between the first indoor air temperature value and the second indoor air temperature value is less than or equal to approximately 0.5° Fahrenheit. Since the temperature change in the case of cooling, a temperature decrease, is greater than approximately 0.5° Fahrenheit, no further action is required and the method returns to step 102. In one embodiment, this is indicative that the HVAC system 10 is operating satisfactorily.

In a subsequent cooling season start, as illustrated by data points 58-70, the system controller 14 determines that when the outdoor HVAC unit 26 begins the cooling cycle, the indoor temperature value is measured at 72° Fahrenheit (i.e. 0° Fahrenheit temperature drop at data point 58). During approximately the first 5 minutes of operation (i.e. the first interval), the indoor air temperature value is measured at 72° Fahrenheit (i.e. first indoor air temperature value at data point 60). The system controller 14 records the indoor air temperature value of 72° Fahrenheit in memory for analysis.

Next, the system controller 14 measures the indoor air temperature value at approximately 10 minutes from the time the first indoor air temperature value was determined. Therefore, at approximately 15 minutes (i.e. the second interval), the indoor air temperature value is measured at approximately 71.7° Fahrenheit (i.e. second indoor air temperature value at data point 64), resulting in an indoor air temperature change of approximately 0.3° Fahrenheit.

In this instance, since the indoor air temperature change is less than approximately 0.5° Fahrenheit, the method 100 proceeds to step 108 of operating the system controller 14 to generate an alert signal. In an embodiment, the alert signal comprises at least one of a visual signal, an audio signal, and an electronic signal.

For example, if the indoor air temperature change is less than approximately 0.5° Fahrenheit, the system controller 14 could display a message or electronically send a message to the user or service provider that the outdoor HVAC unit 28 is not functioning properly or not operating at full capacity, and service is required to name a couple of non-limiting examples.

A similar process may be performed at the start of the heating season to ensure that the heating function of the HVAC system 10 is operating satisfactorily. In such an embodiment, the method 100 would observe whether an indoor air temperature change, in the case of heating, a temperature increase, is less than or equal to the second indoor air temperature change limit.

It will therefore be appreciated that the present embodiments includes a system and method to test an indoor HVAC unit 24 and/or outdoor HVAC unit 26 for proper operation prior to the actual need of operation. This will allow the user to have the indoor HVAC unit 24 and/or outdoor HVAC unit 26 properly serviced before being placed in a scenario of discomfort.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of determining proper operation of an HVAC system including a controller in communication with an HVAC unit, the method comprising:
 (a) operating the controller to generate a test condition;
 (b) operating the HVAC unit in a heating or cooling mode; if the test condition is satisfied;
 (c) operating the controller to determine whether the HVAC unit is performing at an operational tolerance level;

(d) operating the controller to generate an alert signal if the HVAC unit is not performing at the operational tolerance level.

2. The method of claim 1, wherein step (a) further comprises:
   operating the controller to determine whether the HVAC unit has been inoperative in a heating or cooling mode in excess of an idle duration of time; and
   (ii) operating the controller to acquire weather information from an external source, wherein the weather information is based at least upon a geographical location of the at least one HVAC unit.

3. The method of claim 2, wherein the external source is configured to supply up to date, but not necessarily instantaneous, weather information.

4. The method of claim 2, wherein the idle duration of time is greater than or equal to approximately 14 days.

5. The method of claim 3, wherein the weather information comprises a plurality forecasted air temperature values within a forecasted period of time.

6. The method of claim 5, wherein the test condition comprises at least one of:
   (i) determining whether one of the plurality of forecasted air temperature values is greater than or equal to a cooling limit temperature value or whether one of the plurality of forecasted air temperature values is less than or equal to a heating limit temperature value; and
   (ii) determining whether one of the plurality of forecasted air temperature values is greater than or equal to a minimum outdoor air temperature value of the last operation of the HVAC unit in a cooling mode or less than or equal to a maximum outdoor air temperature value of the last operation of the HVAC unit in a heating mode.

7. The method of claim 6, wherein the cooling limit temperature value is approximately 75 degrees Fahrenheit.

8. The method of claim 6, wherein the heating limit temperature value is approximately 50 degrees Fahrenheit.

9. The method of claim 5, wherein the forecasted period of time is less than or equal to 5 days.

10. The method of claim 1, wherein the operational duration of time is less than or equal to approximately 30 minutes.

11. The method of claim 1, wherein in step (b) the HVAC unit operates for an operational duration of time or until a first indoor air temperature change limit has been achieved.

12. The method of claim 11, wherein the first indoor air temperature change limit is approximately 2 degrees Fahrenheit.

13. The method of claim 1, wherein step (c) comprises:
   (i) operating the controller to record a first indoor air temperature value at a first interval and a second indoor air temperature at a second interval; and
   (ii) determining whether the difference between the first indoor temperature air value and the second indoor air temperature value is less than or equal to a second indoor air temperature change limit.

14. The method of claim 13, wherein the first indoor air temperature value comprises a highest indoor air temperature value at the first interval in a cooling mode or a lowest indoor air temperature value at the first interval in a heating mode.

15. The method of claim 13, wherein the first interval comprises an interval greater than or equal to approximately 5 minutes, and the second interval comprises an interval equal to approximately 10 minutes from the determination of either the highest indoor air temperature value at the first interval or the lowest indoor air temperature value at the first interval.

16. The method of claim 13, wherein the second indoor air temperature change limit is less than or equal to approximately 0.5 degrees Fahrenheit.

17. The method of claim 1, wherein the alert signal comprises at least one of a visual signal, an audio signal, and an electronic signal.

18. An HVAC system comprising:
   a system controller including a processor, a memory, and a communication module; and
   an HVAC unit in communication with the system controller;
   wherein the processor is configured to operate a program stored in memory, the program configured to:
   (a) generate a test condition;
   (b) operate the HVAC unit in a heating or cooling mode if the test condition is satisfied;
   (c) determine whether the HVAC unit is performing at an operational tolerance level; and
   (d) generate an alert signal if the HVAC unit is not performing at the operational tolerance level.

19. The HVAC system of claim 18, wherein to generate a test condition, the processor is further configured to determine whether the HVAC unit has been inoperative in excess an idle duration of time, and command the communication module to acquire weather information.

20. The HVAC system of claim 19, wherein the communication module is configured to acquire weather information from an external source based at least upon a geographical location of the HVAC unit, wherein the weather information comprises a plurality forecasted air temperature values within a forecasted period of time.

21. The HVAC system of claim 20, wherein the external source is configured to supply up to date, but not necessarily instantaneous, weather information.

22. The HVAC system of claim 19, wherein the idle duration of time is greater than or equal to approximately 14 days.

23. The HVAC system of claim 19, wherein the processor is further configured to:
   (i) determine whether one of the plurality of forecasted air temperature values is greater than or equal to a cooling limit temperature value or whether one of the plurality of forecasted air temperature values is less than or equal to a heating limit temperature value; and
   (ii) determine whether one of the plurality of forecasted air temperature values is equal to a minimum outdoor air temperature value of the last operation of the HVAC unit in a cooling mode or a maximum outdoor temperature value of the last operation of the HVAC unit in a heating mode.

24. The HVAC system of claim 23, wherein the cooling limit temperature value is approximately 75 degrees Fahrenheit.

25. The HVAC system of claim 23, wherein the heating limit temperature value is approximately 50 degrees Fahrenheit.

26. The HVAC system of claim 20, wherein the forecasted period of time is less than or equal to 5 days.

27. The HVAC system of claim 18, wherein in the processor operates the HVAC unit for an operational duration of time or until a first indoor air temperature change limit has been achieved.

28. The HVAC system of claim 27, wherein the operational duration of time is less than or equal to approximately 30 minutes.

29. The HVAC system of claim 27, wherein the first indoor air temperature change limit is approximately 2 degrees Fahrenheit.

30. The HVAC system of claim 18, wherein to determine whether the HVAC unit is performing at the operational tolerance level, the processor is further configured to:
(i) record a first indoor air temperature value at a first interval and a second indoor air temperature at a second interval; and
(ii) determine whether the difference between the first indoor air temperature value and the second indoor air temperature value is less than or equal to a second indoor air temperature change limit.

31. The HVAC system of claim 30, wherein the first indoor air temperature value comprises a highest indoor air temperature value at the first interval in a cooling mode or a lowest indoor air temperature value at the first interval in a heating mode.

32. The HVAC system of claim 30, wherein the first interval comprises an interval greater than or equal to approximately 5 minutes, and the second interval comprises an interval equal to approximately 10 minutes from the determination of either the highest indoor temperature value at the first interval or the lowest indoor temperature value at the first interval.

33. The HVAC system of claim 30, wherein the second indoor air temperature change limit is less than or equal to approximately 0.5 degrees Fahrenheit.

34. The HVAC system of claim 18, wherein the alert signal comprises at least one of a visual signal, an audio signal, and an electronic signal.

* * * * *